US008960360B2

(12) United States Patent
Sangha et al.

(10) Patent No.: US 8,960,360 B2
(45) Date of Patent: Feb. 24, 2015

(54) INTEGRATED VEHICLE STRUCTURE AND POWER-PLANT EXHAUST

(71) Applicant: GM Global Technology Operations LLC, Detroit, MI (US)

(72) Inventors: Balbir S. Sangha, Ajax (CA); Mario Turco, Ajax (CA)

(73) Assignee: GM Global Technology Operations LLC, Detroit, MI (US)

( * ) Notice: Subject to any disclaimer, the term of this patent is extended or adjusted under 35 U.S.C. 154(b) by 45 days.

(21) Appl. No.: 13/741,415

(22) Filed: Jan. 15, 2013

(65) Prior Publication Data

US 2014/0196972 A1 Jul. 17, 2014

(51) Int. Cl.
| B60K 13/04 | (2006.01) |
| B60K 13/06 | (2006.01) |
| B60K 15/03 | (2006.01) |
| B60K 1/04 | (2006.01) |
| B60K 5/02 | (2006.01) |
| B60K 15/07 | (2006.01) |
| B60K 15/063 | (2006.01) |

(52) U.S. Cl.
CPC ....... *B60K 13/06* (2013.01); *B60K 2015/03315* (2013.01); *B60K 1/04* (2013.01); *B60K 5/02* (2013.01); *B60K 13/04* (2013.01); *B60K 15/07* (2013.01); *B60K 2001/0411* (2013.01); *B60K 2015/0636* (2013.01); *B60K 2015/0638* (2013.01)
USPC .......................................................... 180/309

(58) Field of Classification Search
CPC ................. B60K 13/02–13/04; F02M 35/162; F01N 13/08
USPC .............. 180/68.3, 390; 138/118.1, 133–134, 138/124; 429/34
See application file for complete search history.

(56) References Cited

U.S. PATENT DOCUMENTS

| 3,116,803 | A | * | 1/1964 | Buchwald | ...................... 180/309 |
| 5,400,830 | A | * | 3/1995 | Stiles et al. | ................... 138/149 |
| 8,505,672 | B2 | * | 8/2013 | Schulze | ........................ 180/309 |

* cited by examiner

*Primary Examiner* — John Walters
*Assistant Examiner* — James Triggs
(74) *Attorney, Agent, or Firm* — Quinn Law Group, PLLC

(57) ABSTRACT

A frame is disclosed for a vehicle having a vehicle body, a vehicle suspension, and a power-plant configured to generate torque and an exhaust gas stream. The frame includes a tubular frame rail in fluid communication with the power-plant, wherein the rail is defined by a fully-closed cross-section that provides a fluid passage. The frame rail is configured to support the vehicle body and the vehicle suspension. The fluid passage is configured to channel the exhaust gas stream through the frame rail and away from the vehicle body. A vehicle employing such a frame is also disclosed.

20 Claims, 2 Drawing Sheets

INTEGRATED VEHICLE STRUCTURE AND POWER-PLANT EXHAUST

TECHNICAL FIELD

The invention relates to a vehicle structure integrated with a power-plant exhaust system.

BACKGROUND

Typically, a vehicle includes a structure for enclosing and supporting various vehicle systems, as well as the vehicle passengers. Heavy-duty vehicles, such as pick-up trucks and vans, commonly employ a frame to support a body and a powertrain of the vehicle. On the other hand, light-duty vehicles, such as a majority of passenger cars, often employ a monocoque or unibody construction that eschews a separate body and frame, in favor of a lighter, integrated structure. Additionally, some lighter-duty vehicles employ a combination monocoque structure with a subframe for carrying the vehicle's powertrain. Frequently, additional structural members are used to buttress the vehicle structure, as well as for supporting various chassis and powertrain subsystems.

SUMMARY

A frame is disclosed for a vehicle having a vehicle body, a vehicle suspension, and a power-plant configured to generate torque and an exhaust gas stream by-product. The frame includes a tubular frame rail in fluid communication with the power-plant, wherein the rail is defined by a fully-closed cross-section that provides a fluid passage. The frame rail is configured to support the vehicle body and the vehicle suspension. The fluid passage is configured to channel the exhaust gas stream through the frame rail and away from the vehicle body. A vehicle employing such a frame is also disclosed.

The frame rail may include two substantially parallel rails spaced apart by a distance.

The fluid passage may include an inside surface in direct contact with the exhaust gas stream, wherein the inside surface may include a coating configured to minimize corrosion of the frame rail.

The coating may be generated via a galvanization or a galvannealing process. Additionally, the coating may either be a rubberized or an epoxy compound.

The frame rail may be formed from an aluminized stainless steel.

The frame rail cross-section may have either a substantially parallelogram "boxed" shape or a substantially round shape.

The frame rail may be formed by a process of extrusion or hydro-forming.

A vehicle employing such a frame is also disclosed.

The power-plant may be a hydrogen fuel-cell, while the vehicle may then also include a hydrogen fuel tank in fluid communication with the fuel-cell. In such a case, the frame may also be configured to support the hydrogen fuel tank.

The above features and advantages, and other features and advantages of the present disclosure, will be readily apparent from the following detailed description of the embodiment(s) and best mode(s) for carrying out the described invention when taken in connection with the accompanying drawings and appended claims.

DETAILED DESCRIPTION

Figure 1:
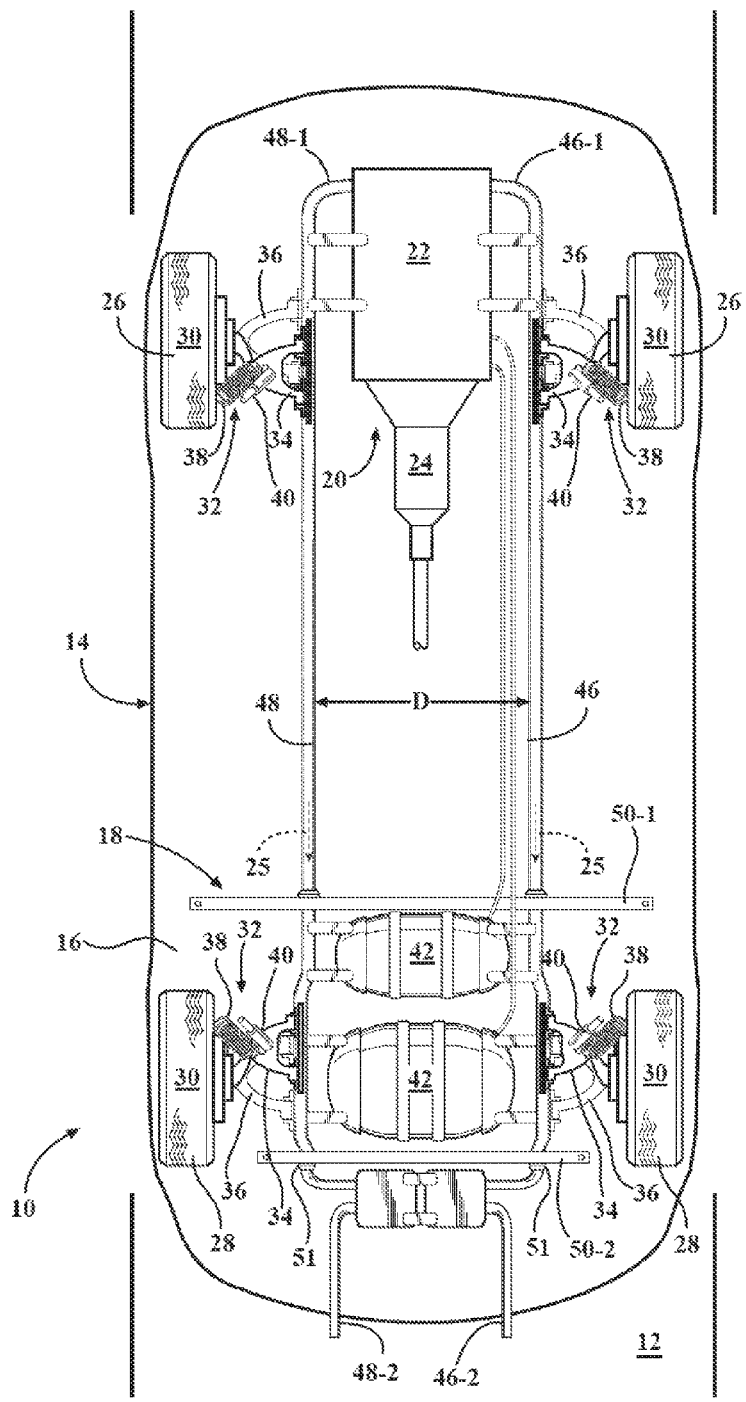
FIG. 1 is a schematic plan view of a vehicle structure including a frame, a powertrain including a power-plant, a transmission, fuel tanks, and integrated vehicle frame rails and exhaust passages.

Referring to the drawings, wherein like reference numbers refer to like components, FIG. 1 shows a schematic view of a motor vehicle 10 positioned relative to a road surface 12. The vehicle 10 includes a vehicle structure 14, which includes a vehicle body 16 and a vehicle frame 18. The vehicle 10 also includes a powertrain 20 configured to propel the vehicle. The frame 18 is configured to support the vehicle body 16 and also to channel an exhaust stream away from the body, as set forth in detail below with respect to FIG. 3.

As shown in FIG. 1, the powertrain 20 includes a power-plant 22 configured to generate torque to power the vehicle 10 and a transmission assembly 24. As a by-product of the generated torque, the power-plant 22 generates an exhaust gas stream 25. In FIG. 1 the vehicle 10 is depicted as a fuel-cell type vehicle, and the power-plant 22 is depicted as a fuel-cell. Alternatively, the vehicle 10 may be a gas/electric hybrid (not shown) and employ a powertrain 20 that includes one or more motor/generators in conjunction with an internal combustion (IC) engine. Furthermore, the vehicle 10 may be a conventional type (not shown) powered only by an IC engine. Although neither the gas/electric hybrid nor the conventional vehicle types are specifically shown, such configurations are well known and would be easily envisioned by those skilled in the art.

With continued reference to FIG. 1, the vehicle 10 also includes a plurality of wheels 26 and 28. As shown, each of the plurality of wheels 26, 28 may include an inflatable tire 30 mounted thereon. Although four wheels 26, 28 with tires 30 are shown in FIG. 1, a vehicle with fewer or greater number of wheels and tires is also envisioned. Depending on the specific configuration of the powertrain 20, torque of the power-plant 22 may be transmitted to the road surface 12 through the wheels 26, the wheels 28, or through all the wheels 26 and 28.

As shown in FIG. 1, a vehicle suspension system 32 operatively connects the frame 18 to the wheels 26, 28 for maintaining contact between the wheels and the road surface 12, and for maintaining handling of the vehicle 10. As shown, the suspension system 32 may include a plurality of upper control arms 34 and lower control arms 36, wherein one upper and one lower control arm is connected to one of the wheels 26, 28. Although a specific configuration of the suspension system 32 is shown in FIG. 1, other vehicle suspension designs are similarly envisioned. The suspension system 32 also includes springs 38 and dampers 40. Each spring 38 and damper 40 is configured to control deflection of the respective wheel 26, 28 as the vehicle 10 traverses the road surface 12 and the subject wheel's subsequent rebound.

As shown, the frame 18 may be separate from the body 16, as is typically employed in heavier-duty work vehicles, such as pick-up trucks and vans, or be a part of a unibody structure, as is typically employed in lighter duty vehicles. In the case of separate vehicle body 16 and frame 18, the frame additionally supports the body, while in the case of a unibody structure, the frame and the body each carry a portion of the structural load. In either the separate frame or the unibody case, the frame 18 is configured to withstand considerable stress without experiencing structural damage, while supporting the vehicle powertrain 20, absorbing vibration thereof, and withstanding the torque generated by engine 18 during propulsion. Additionally, whether in the separate frame or the unibody case, the frame 18 is configured to support the load of vehicle passengers and cargo, and any additional loads passed through the suspension system 32. The frame 18 may be attached to the body 16 by any known means such as welding or via appropriate fasteners.

Figure 2:
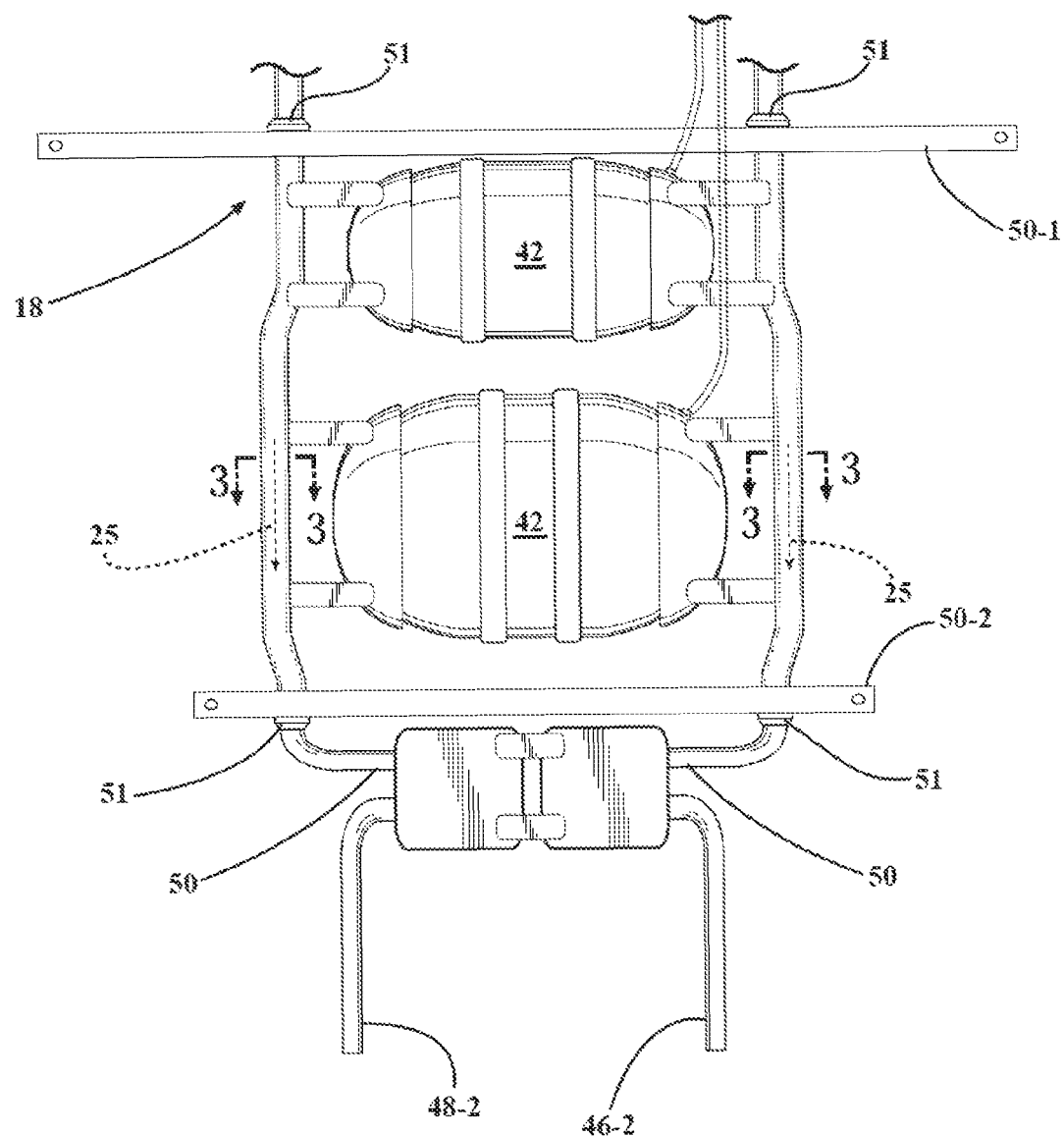
FIG. 2 is a close-up view of the power-plant being supported by and connected to the frame rails that are configured to direct power-plant exhaust away from the vehicle, as shown in FIG. 1.

In the specific case where the power-plant 22 is a fuel-cell, as shown in FIGS. 1 and 2, the vehicle 10 also includes one or more hydrogen fuel tanks 42. The hydrogen fuel tank 42 is in fluid communication with the power-plant 22 and configured to supply the hydrogen fuel thereto. When the vehicle 10 employs the hydrogen fuel tank 42, the frame 18 may additionally support the hydrogen fuel tank. In the case that the power-plant 22 is a gas/electric hybrid (not shown) and includes motor/generators and/or an IC engine, the vehicle 10 may include a fuel tank for the IC engine and an energy storage device, such as one or more batteries. Accordingly, in the gas/electric hybrid vehicle, the frame 18 may additionally support the fuel tank and the energy storage device. In the case that the power-plant 22 is an IC engine, the frame 18 may be configured to support the engine and the fuel tank.

Figure 3:
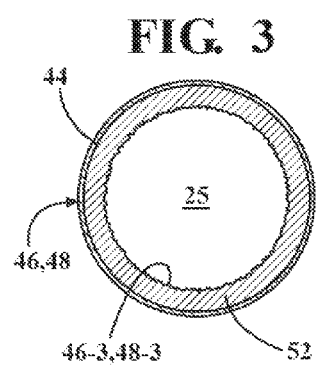
FIG. 3 is an illustration of a cross-section of the frame rails shown in FIGS. 1 and 2.

As shown in FIG. 3, the frame 18 includes a tubular frame rail defined by a fully-closed cross-section 44. As shown in FIG. 1, the frame 18 includes two substantially parallel frame rails, 46 and 48, separated in the vehicle structure 14 by a distance D. Although two frame rails are specifically shown and described herein, the frame 18 may include only one or any other number of frame rails, as deemed necessary for supporting the above-noted vehicle subsystems. The frame rails 46 and 48 may be formed from an appropriate high-strength material, such as steel, by any appropriate method, e.g., extrusion, hydro-forming, roll-forming, as well as stamping and welding.

As shown in FIG. 2, each of the rails 46, 48 defines a hermetically sealed volume along the particular rail's length. The rails 46, 48 are connected at first distal ends 46-1 and 48-1, respectively, to the power-plant 22. Therefore, the entire length of each rail 46 and 48 is in fluid communication with power-plant 22. The rails 46, 48 are also open to the atmosphere at second distal ends 46-2 and 48-2, respectively. When the power-plant is operating and generating torque, the exhaust gas stream 25 is channeled from the power-plant 22 via the manifolds 50, through the frame rails 46, 48, and away from the vehicle body 16 to the atmosphere. Therefore, in addition to functioning as structural members that are part of the frame 48, the frame rails 46, 48 additionally operate as fluid passages for channeling the exhaust gas stream 25 away from the power-plant 22. As such, the fluid passages provided in the frame rails 46, 48 include inside surfaces, 46-3 and 48-3, respectively, configured for direct contact with the exhaust gas stream 25. Additionally, the frame rails 46 and 48 may be connected to cross members 50-1 and 50-2 via couplings 51. Couplings 51 may include drainage provisions to expel any condensate that would otherwise collect inside the rails 46, 48 from the exhaust gas stream 25 during operation of the power-plant 22.

The frame rails 46, 48 may be formed from steels ranging from typical low-grade carbon steel to high-grade type, for example GMW3032M-ST-S hot-rolled HR550 or cold-rolled CR560, while using a wide range of material gauges appropriate to the particular loads seen by the frame rails in the vehicle 10. Furthermore, the frame rails 46, 48 may be formed from a robust material, such as aluminized stainless steel. The cross-section 44 may have a substantially parallelogram "boxed", i.e., closed section, shape or a substantially round shape. The frame rails 46, 48 may be subsequently bent or routed to accommodate the packaging of other components and subsystems in the vehicle 10 while maintaining the required load bearing characteristics. As such, the above mentioned material selection and the external form of the rails 46, 48 are typically a function of expected vehicle loads, durability, and packaging requirements.

In the case of the rails 46, 48 being formed from aluminized stainless steel or stainless steel that is either galvanized or treated with a Galva anneal process, i.e., galvannealed. The inside surfaces 46-3, 48-3 of the rails may include a temperature-resistant coating 52 applied thereto (shown in FIG. 3). In such a case, the exhaust gas stream 25 will traverse the coated surfaces 46-3, 48-3 along the length of the rails 46, 48 on the way to the atmosphere. The coating 52 may be a urethane or rubberized compound configured to protect the inside surfaces 46-3 and 48-3 from corrosion or oxidation due to various particles present in the exhaust gas stream 25. The coating 52 may be an epoxy resin, formulated from a silicone, or any other suitable temperature-resistant compound configured to achieve the same result. Additionally, to generate the coating 52, a protective layer of zinc may be generated by galvanization or the subject surfaces may be galvannealed via a combined process of galvanizing and annealing.

In the embodiment where the power-plant 22 is a hydrogen fuel-cell, the temperature of the exhaust gas stream 25 may be below 100 degrees Celsius. On the other hand, wherein the power-plant 22 is an IC engine, the temperature of the exhaust gas stream 25 may exceed 800 degrees Celsius. As such, the thermal stresses and corrosion on the inside surfaces 46-3, 48-3 are likely to be significantly lower in the case of the fuel-cell as compared with the IC engine. Accordingly, in the case where the power-plant 22 is a hydrogen fuel-cell, the inside surfaces 46-3, 48-3 of the rails 46, 48 may be coated with the high-temperature rubberized compound or the epoxy. In the case where the power-plant 22 is an IC engine, the rails 46, 48 may be formed from an aerospace-grade stainless steel, while the components coated with the rubberized compound or epoxy may be additionally thermally isolated via any known methods. The above-mentioned selection of stainless steel for the rails 46, 48 may allow the rails to durably withstanding sustained elevated temperatures in the presence of the exhaust gas stream 25, as well as retain the long-term structural support of vehicle subsystems noted above.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A frame for a vehicle having a vehicle body, a vehicle suspension, and a power-plant configured to generate torque and an exhaust gas stream, the frame comprising:
   a tubular frame rail in fluid communication with the power-plant, wherein the frame rail is defined by a fully-closed cross-section that provides a fluid passage;
   wherein:
   the frame rail is configured to support the vehicle body and the vehicle suspension; and
   the fluid passage is configured to channel the exhaust gas through the frame rail and away from the vehicle body.

2. The frame of claim 1, wherein the frame rail includes two substantially parallel rails spaced apart by a distance.

3. The frame of claim 1, wherein the fluid passage includes an inside surface in direct contact with the exhaust gas stream and the inside surface includes a coating applied thereto and configured to minimize corrosion of the frame rail.

4. The frame of claim 3, wherein the coating is generated via a galvanization process.

5. The frame of claim 3, wherein the coating is generated via a process of galvannealing.

6. The frame of claim 1, wherein the frame rail is formed from an aluminized stainless steel.

7. The frame of claim 1, wherein the frame rail cross-section forms a substantially parallelogram "boxed" shape.

8. The frame of claim 1, wherein the frame rail cross-section forms a substantially round shape.

9. The frame of claim 1, wherein the frame rail is formed by a process of extrusion.

10. The frame of claim 1, wherein the vehicle power-plant is a hydrogen fuel-cell in fluid communication with a hydrogen fuel tank, and wherein the frame is additionally configured to support the hydrogen fuel tank.

11. A vehicle comprising:
    a vehicle body;
    a vehicle suspension;
    a power-plant configured to generate torque and an exhaust gas stream; and
    a frame configured to support the body and the suspension, the frame having a tubular frame rail in fluid communication with the power-plant, wherein the frame rail is defined by a fully-closed cross-section that provides a fluid passage; the fluid passage is configured to channel the exhaust gas through the frame rail and away from the vehicle body.

12. The vehicle of claim 11, wherein the frame rail includes two substantially parallel rails spaced apart by a distance.

13. The vehicle of claim 11, wherein the fluid passage includes an inside surface in direct contact with the exhaust gas stream and the inside surface includes a coating applied thereto and configured to minimize corrosion of the frame rail.

14. The vehicle of claim 13, wherein the coating is generated via a galvanization process.

15. The vehicle of claim 13, wherein the coating is generated via a process of galvannealing.

16. The vehicle of claim 11, wherein the frame rail is formed from an aluminized stainless steel.

17. The vehicle of claim 11, wherein the frame rail cross-section forms a substantially parallelogram "boxed" shape.

18. The vehicle of claim 11, wherein the frame rail cross-section forms a substantially round shape.

19. The vehicle of claim 11, wherein the frame rail is formed by a process of extrusion.

20. The vehicle of claim 11, wherein the power-plant is a hydrogen fuel-cell, the vehicle further comprises a hydrogen fuel tank in fluid communication with the fuel-cell, and the frame is additionally configured to support the hydrogen fuel tank.

\* \* \* \* \*